(12) United States Patent
Ruelke et al.

(10) Patent No.: US 7,263,363 B2
(45) Date of Patent: Aug. 28, 2007

(54) METHOD FOR MITIGATING INTERMODULATION INTERFERENCE USING CHANNEL POWER ESTIMATION AND ATTENUATION IN A TWO-WAY RADIO COMMUNICATIONS SYSTEM

(75) Inventors: Charles R. Ruelke, Margate, FL (US); Apoorv Chaudhri, Sunrise, FL (US); Darrell J. Stogner, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 120 days.

(21) Appl. No.: 10/954,575

(22) Filed: Sep. 30, 2004

(65) Prior Publication Data

US 2006/0068800 A1 Mar. 30, 2006

(51) Int. Cl.
*H04Q 7/20* (2006.01)
(52) U.S. Cl. ............... 455/450; 455/234.1; 455/241.1
(58) Field of Classification Search ............... 455/302, 455/234.1, 67.13, 63.1, 450, 241.1, 240, 455/250; 370/336
See application file for complete search history.

(56) References Cited

U.S. PATENT DOCUMENTS

| | | | |
|---|---|---|---|
| 5,159,593 A | 10/1992 | D'Amico et al. | |
| 5,249,303 A | 9/1993 | Goeken | |
| 5,303,289 A | 4/1994 | Quinn | |
| 5,758,271 A * | 5/1998 | Rich et al. | 455/234.1 |
| 6,055,427 A | 4/2000 | Ojaniemi | |
| 6,266,530 B1 | 7/2001 | Stalo | |
| 6,591,100 B1 | 7/2003 | Dent | |
| 2002/0054583 A1* | 5/2002 | Olesen et al. | 370/336 |
| 2002/0146996 A1* | 10/2002 | Bachman et al. | 455/302 |
| 2003/0064695 A1* | 4/2003 | Shi | 455/302 |
| 2004/0198234 A1* | 10/2004 | Wacker et al. | 455/67.13 |
| 2004/0203403 A1* | 10/2004 | Cutcher et al. | 455/63.1 |

\* cited by examiner

*Primary Examiner*—Joseph Feild
*Assistant Examiner*—Michael Vu

(57) ABSTRACT

A method for maximizing intermodulation interference protection during a handoff between radio cell sites (300) includes scanning a plurality of radio channels (302) and measuring the signal power (307, 315) for at least one of the radio channels. One or more receiver attenuators (313) are then set based on the detection of intermodulation (IM) interference of the measured channel. The attenuators are then scaled (311) based on the degree of IM interference. If the attenuators cannot mitigate this interference below some predetermined level, the radio channel is changed (321) and the process begins again to ensure a high quality of communication with a cell site.

7 Claims, 3 Drawing Sheets

METHOD FOR MITIGATING INTERMODULATION INTERFERENCE USING CHANNEL POWER ESTIMATION AND ATTENUATION IN A TWO-WAY RADIO COMMUNICATIONS SYSTEM

TECHNICAL FIELD

This invention relates in general to mobile assisted handoff (MAHO) techniques and more particularly to MAHO with interference mitigation using step attenuation.

BACKGROUND

Cellular and trunked radio communications systems are well known in the art and work to provide seamless communication as a subscriber unit moves about a geographic area covered by base sites within a predefined network. Most often, the subscriber and base units communicate using various types of linear modulation techniques that typically require a receiver with a substantially high dynamic range. Several types of problems are often associated with using such a receiver such as intermodulation (IM) distortion and blocking. This type of interference can be produced by high-power radio services using public service bands that can cause problems in establishing reliable communications between the base site and subscriber.

As best seen in prior art FIG. 1, a typical cellular network 100 operates with a plurality of target base sites 101-106 which are tied to a source base site 107. As a subscriber radio 109 travels through a site such as target base site 106, the site works to coordinate handoff to adjacent sites through the source base site 107. Problems regarding interference and handoff have been addressed in the prior art, and include such solutions as U.S. Pat. No. 6,266,530 entitled Multi-Cell Communications System and Method for Allocating a Communications Resource and U.S. Pat. No. 6,055,427 entitled Hard Handoff and Radio System which are both herein incorporated by reference.

Generally, there are two methods used in handing off subscriber units between cell sites. One method is the site-assisted method where the cell site measures the received signal strength indication (RSSI) of the subscriber's transmitted signal to determine when to handoff a subscriber to an adjacent site. A second handoff strategy is unassisted where a portable subscriber unit typically estimates carrier power on one cell site and moves to another site when the adjacent site carrier power measurement exceeds some threshold condition. There are many different algorithms that are used by either the cell site or the subscriber unit but each is similar in that the algorithm indicates to either the cell site or subscriber unit when the switch is going to occur.

One problem that may occur to the receiver in the subscriber unit is degraded reception due to intermodulation (IM) interference by strong in-band interference signals. This can greatly interfere with the subscriber's ability to receive reliable communications. Although various methods have been employed in order to reduce IM interference with the receiver, these methods often required the receiver to search and select alternative cell sites based on receiver performance for a particular channel. Alternatively, a cell system may depend on multiple transmission attempts where the same message is transmitted from a given cell repeatedly until reception is achieved. Both of these techniques effectively reduce system capacity by increasing redundant messaging or by increasing excess reuse of certain cell sites.

Accordingly, there is a need to provide a method for mitigating IM interference without reducing system capabilities or capacity.

SUMMARY OF THE INVENTION

Briefly, according to the invention, there is provided a method that determines when to enable step attenuation without a subscriber unit having to acquire synchronization with a cellular site. The method affords improved "functional" immunity to IM or far out blocking since activation of IM enhancement is independent of proper demodulation. Thus, IM and blocking degradation will not prevent engagement of IM protection without the need for multiple receivers to determine interference exists. Moreover, enhanced site selection is achieved by strategic understanding of the operating environment in adjacent channel slots and selecting an operating channel based on interference profile as well as on channel parameters.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
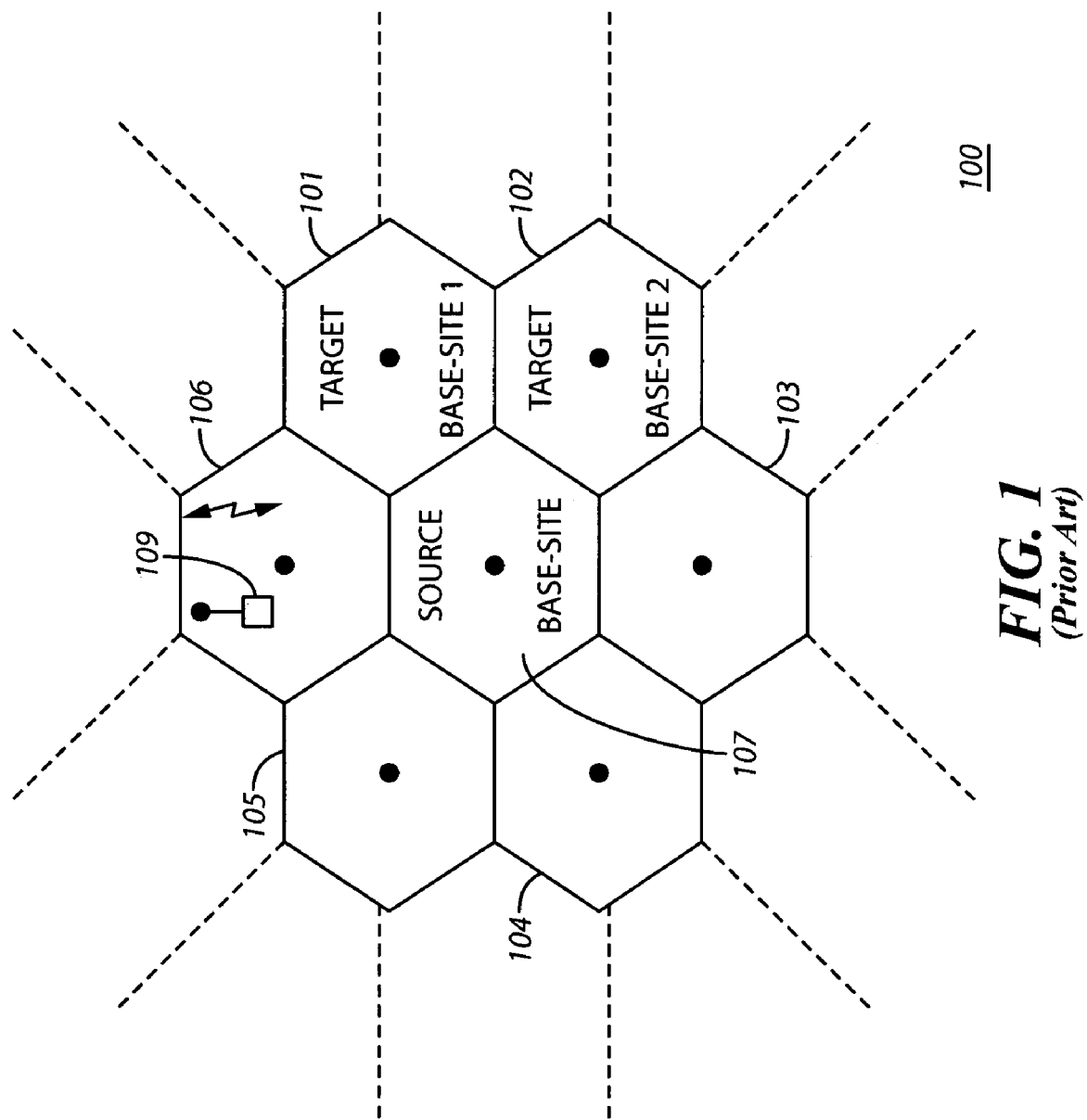
FIG. 1 is a prior art system block diagram illustrating operation of a typical cellular-type radio site.

While the specification concludes with claims defining the features of the invention that are regarded as novel, it is believed that the invention will be better understood from a consideration of the following description in conjunction with the drawing figures, in which like reference numerals are carried forward.

Figure 2:
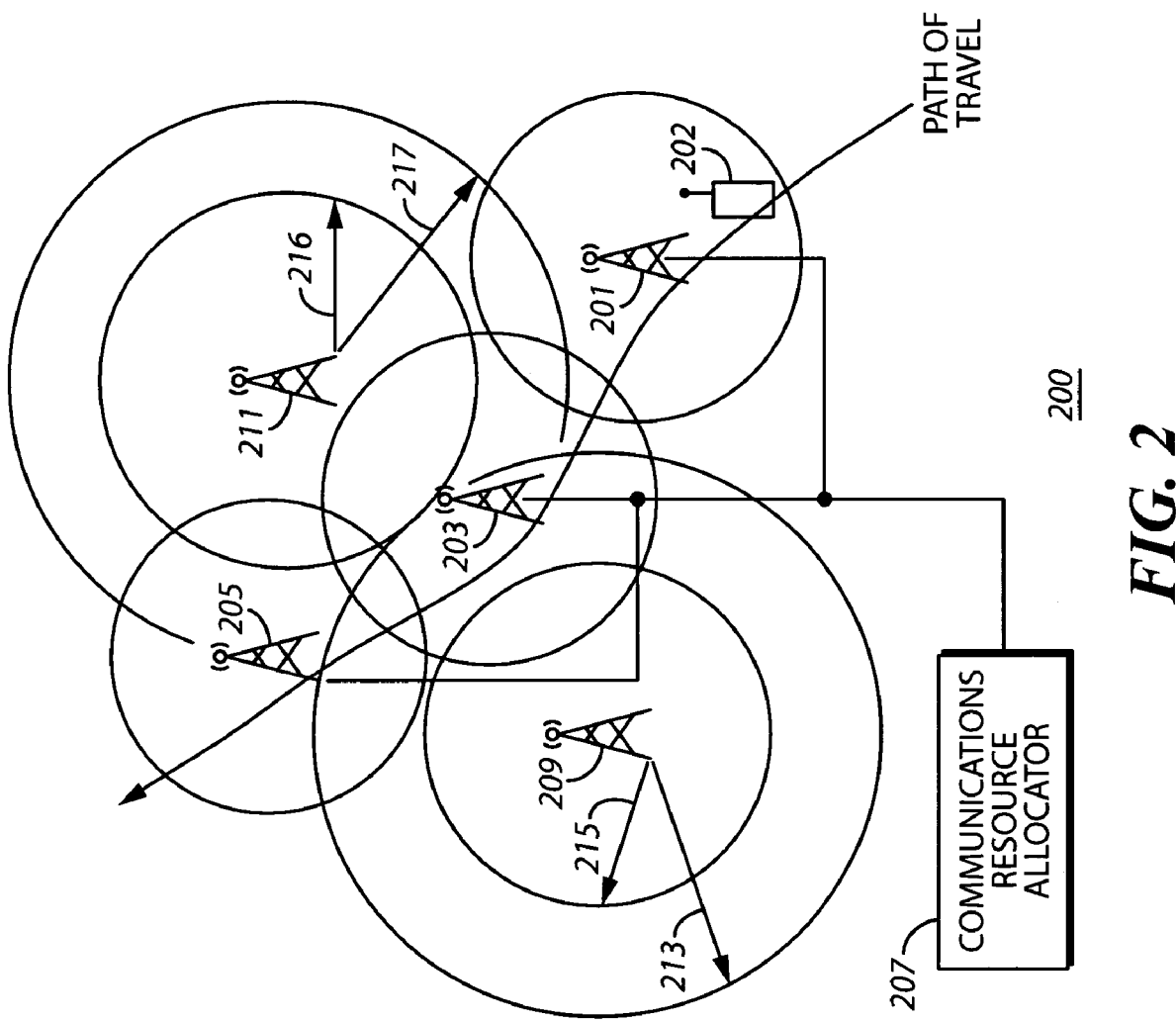
FIG. 2 is a radio block diagram showing operation of a cell site when using the interference mitigating method as described by the present invention.

In accordance with the present invention, a method of site selection is provided that emphasizes handset control of the selection using integrated automatic gain control (AGC) techniques to maximize IM performance and blocking performance a priori to handoff. Currently, handoff techniques between subscriber and base focus on the management of system parameters by a centralized base station. As seen in FIG. 2, as a subscriber 202 traverses through a cellular-type network 200 the handoff between cell sites 201, 203, 205 is controlled by a communications resource allocator 207. As a subscriber moves from cell site to cell site, the subscriber receiver is often affected by interference from adjacent cell sites such as cell sites 209, 211 that typically operate at substantially high power levels. These adjacent cell sites often operate in a band dissimilar to that of the subscriber receiver and may be used for a different purpose. Typically, land mobile-based, two-way radio systems operating as a trunked repeater network may receive IM interference from commercial cellular telephone carrier or other governmental or public safety two-way radio systems.

When intermodulation (IM) interference does become a problem, a solution in accordance with the present invention is to use a step attenuator to optimally block and/or reduce the IM interference to a level where it is no longer burdensome to the receiver in subscriber 202. As best seen in FIG. 2, IM interference affects a subscriber based on the proximity of the subscriber to the cell site. For example, cell sites 209, 211 illustrate the range upon which the IM interference would affect the receiver as it moves on its path of travel. As the subscriber 202 moves through the network, toward cell site 203, the subscriber receiver can be affected by one or both cell sites 209, 211. A greater degree of interference can occur as the range of IM interference of both respective sites begins to overlap. This can cause many problems at the subscriber 202 receiver as it must differentiate between the receiving interference from two IM interference sources and its primary communication with cell site 203 or other sites along its path.

When using a step attenuator in accordance with the invention, the IM interference generated in the subscriber receiver can be greatly reduced by engaging appropriate attenuation strategically distributed within the receiver. This added attenuation will cause the on-channel received signal power to be reduced decibel to decibel (dB to dB); however, the reduction in undesired interference signal level would be greater, resulting in a net improvement in the desired signal-to-interference ratio. For example, a one dB increase in attenuation would result in a 2 dB reduction in interference power if the interference mechanism was the result of second order IM. For third order IM there is a 3 dB reduction in interference power for each dB of attenuation applied. Therefore, when receiving a desired on-channel signal above a designated threshold in the presence of an interference signal, the introduction of attenuation in the receiver may reduce interference power to a greater extent than the associated reduction in the desired signal, resulting in a net increase in the desired signal quality. This can greatly reduce the geographic range in which IM interference can degrade receiver operation, or conversely, engaging said attenuation can functionally increase the effective range of the receiver in the presence of interference.

For example, from FIG. 2, given portable radio 202 operating in a cell network composed of cell sites 201, 203, and 205 covering a minimum geographic region (independent of receiver attenuation) designated by the associated circles centered about said transmitters, and given an interference source located at cell site 209 and cell 211, then the region of IM interference generated by 209 and 211 within a standard receiver is designated by ranges 213 and 217, respectively. Notice that for a standard receiver, the overlap region of circles 213 and 217 intersects the path of travel for radio 202 as illustrated in FIG. 2; thus indicating that radio 202 will have degraded receptivity due to increased interference once inside said region 213 or 217. However, should attenuation be engaged in the receiver through the preferred embodiment described herein, the IM susceptibility of the receiver could be reduced to ranges 215 and 216, respectively, depending on the level of attenuation engaged. This allows the subscriber 202 to traverse the path of travel with little to no interference from adjacent transmitting sites, depending on the degree of attenuation selected.

Since new protocols being developed for next generation land mobile two-way radio products use linear modulation techniques to maintain optimal communication, a linear receiver with large dynamic range is typically required. Thus, IM distortion and blocking produced by high-power services in the public service bands is a significant concern in view of these receiver requirements. The present invention defines a method for maximizing IM and blocking protection during a handoff between cells. In this process, accurate power measurements of the new channel are made during the channel scan procedure, and the results are used to preset receiver attenuators prior to receiving the first slot of the new channel. The amount of attenuation is scaled to the measured signal power, providing the maximum amount of IM blocking protection, while maintaining operational sensitivity of the receiver. Moreover, the rate of scan of adjacent channels can be varied based on number of attenuators presently engaged. Thus, with more interference a higher the rate of scan of adjacent channels can be selected as the probability of site switch increases.

To accomplish this, the RF attenuation is selected based on the on-channel (desired) RF signal strength. A series of attenuators (5, 10, 15, 20, etc) are switched in as allowed based on real-time monitoring of the RSSI. The higher the signal level, the more attenuation is allowed. The initial threshold for engaging attenuation is set based on the modulation SNR for usable sensitivity (i.e., 16 dB for 1% BER 16QAM Scalable Advanced Modulation) plus some predefined margin (typically 5-10 dB) to allow for slight fades. Then the attenuation is incrementally increase in predefined sections as the desired signal level continues to increase, and removed as the signal reduces. Those skilled in the art will recognize that the attenuator configuration can be composed of individual stand alone attenuators of different values, or a series of equal value, 3 dB to 5 dB (or some other value) attenuators engaged so as to create the targeted total attenuation. The benefits offered by the method of the invention include a faster handoff and improved coverage and capacity.

Figure 3:
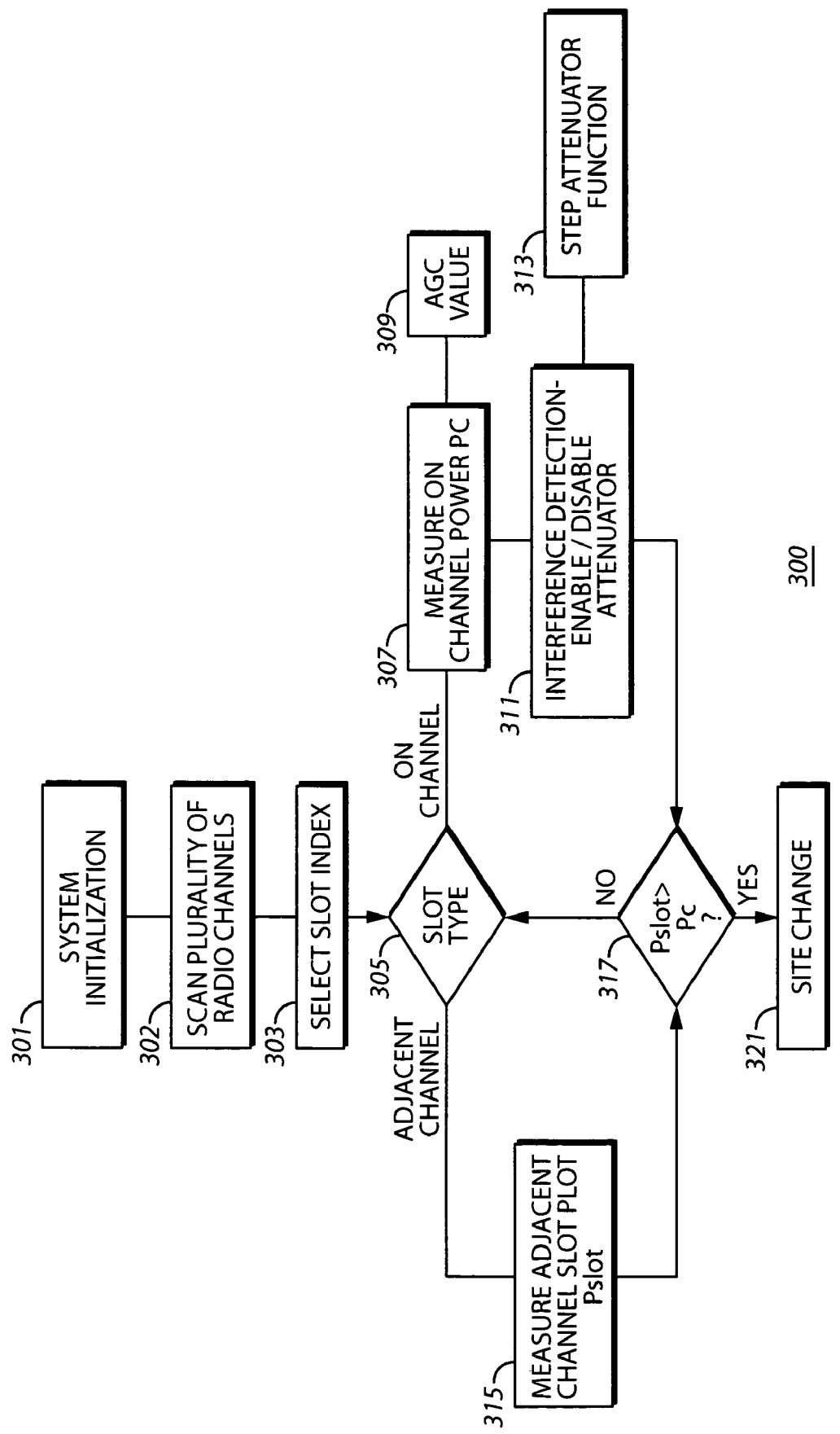
FIG. 3 is a flow chart diagram showing the step attenuation method in accordance with a preferred embodiment of the invention.

Referring now to FIG. 3, a flow chart diagram shows the operation of the method for using a radio device incorporating integrated mobile assisted handoff and automatic gain control (AGC) apparatus using correlated, non-synchronous, time sampled data. The method of the present invention integrates AGC control and cell site selection for protocols using unsynchronized signal strength indication (SSI) data that may provide a signal quality estimation (SQE) metric. According to the invention, the SSI data is processed using appropriate algorithms on either synchronized or unsynchronized in-phase and quadrature (I/Q) samples to generate power estimates. For channels where synchronization is achieved, a power measurement based on the sync and pilot symbols that are embedded in the time slots is used to determine very accurate power estimates. For non-synchronized operation, the power estimate is generated from raw SSI data using a classic sum of square operation on the I/Q signals. These power estimates for on channel and adjacent channel slots are used to understand the approximate carrier-to-noise ratio (CNR) and the interference environment to which the receiver is subjected. Taken in combination with an a priori knowledge of the present AGC operating conditions, and applying the AGC state that is best suited for optimum IM conditions, a decision is made as to the proper AGC configuration, and the proper on channel site to be used prior to the attempt to demodulate the desired received data.

As seen in the flow chart diagram, the present algorithm in software is initialized 301 when the two-way subscriber communications device is first activated. Typically, this might include the microprocessor and/or the digital signal processor (DSP) that is loaded with radio system software allowing the subscriber radio to operate within the communications system. A plurality of radio channels are then scanned 301 and a slot index is then selected 303 which enables the subscriber to interpret incoming data on one or more time slots in a time. A slot index is then selected 303 which enables the subscriber to interpret incoming data on one or more time slots in a time division multiplexed (TDM) communications system. This enables the receiver to interpret information from one or more cell sites depending on what slot index is selected. A slot type is then selected 305 which is either an on-channel slot or an adjacent channel slot.

Once the on-channel slot type is selected, the on-channel signal power ($P_c$) is estimated in 307 using a combination of the hardware gain lineup and the base band signal swing to the DSP. The estimated power is used to detect 311 IM interference and to determine hardware attenuator settings for IM mitigation and to assist in cell site selection. In the preferred embodiment, the AGC value 309 is used to determine the value of the hardware attenuator settings 313 by the interference detection 311. Thus, the overall gain from the receiver antenna in the subscriber radio to the DSP is determined by the interference detection 311 and step attenuator 313. These values can be determined a priori with this function implemented using a simple table lookup inside a DSP within the subscriber radio. The AGC parameter settings used in the handoff algorithm prevent this value from varying significantly, even under most fading conditions.

A similar process is performed for an adjacent channel slot type where adjacent channel slot power ($P_{slot}$) is measured 315. Once the $P_{slot}$ power estimation is determined, it is compared 317 against the on-channel power estimation value $P_c$. If $P_{slot}$ is greater than $P_c$, then a site change occurs 321 due to the inability of the step attenuator function 313 to control the amount of on-channel interference. If $P_C$ remains greater than $P_{slot}$, then the process loop continues with the slot type determination 305 and the channel power being measured for both adjacent channel and on-channel values.

In the preferred embodiment of the invention, the power of the base band I/Q signal is measured over a time period using a sum of the squares ($I^2+Q^2$) formula. Confidence intervals for the power measurements under different channel conditions will typically range between 90 to 95 percent. Since error magnitude is inversely proportional to the square root of the number of measurements after two measurements, the error magnitude can be decreased by sqrt(2)~=1.414=1.5=dB per measurement. This slot time is sufficient to allow a 13 ms measurement period without excessive loss of data. Thus, an approximate 7 dB (99%) or 5 dB (95%) confidence interval can be realized for a single measurement period in the initial IM mitigation setting. For mobility or steady state IM mitigation, several measurements are possible.

It should be recognized by those skilled in the art that the power estimate based in the RSSI measurement does not discriminate between the on-channel signal and off-channel interferers. The power estimate is an indication of signal conditions (on or off channel) that falls into the analog-to-digital (A-to-D) converter's pass band. Therefore, the power detection estimate from the SSI is used only for step attenuator control to expedite configuration of the receiver front end for optimum operation prior to attempting to receive a desired on-channel signal. Because the power estimate does not discriminate between desired and interference power levels, the threshold for engaging the step attenuators is set high, i.e., above A-to-D converter's dynamic range, which presupposes that standard "continuous" AGC is already engaged.

Given that the broadband power estimate indicates high radio frequency (RF) power levels, and that sufficient attenuation has already been engaged by an autonomous AGC controller (AGC bit activity on SSI), the subscriber may elect to engage fixed level step attenuators in the receiver front end to maximize IM and blocking immunity. The amount of attenuation that is engaged is scaled to the power estimate, thus the receiver's performance is tailored for a given operating environment Given power estimate accuracies <3 dB, precision step attenuators as small as 3 dB can be used to maximize usable operating range by minimizing IM and blocking contributors, while not significantly degrading the operational sensitivity of the receiver. For extremely strong signal operating environments, where the detected power is greater than the operational blocking limit of the receiver (i.e., −15 dBm estimated power where the receiver may have lost significant sensitivity already due to the presence of a strong signal interferer), larger attenuators (i.e., 10 dB to 20 dB) can be engaged without a priori knowledge of the absolute RF power of the desired signal. This is all accomplished by power estimates generated from the SSI without requiring proper demodulation and signal acquisition, or relying on multiple retries to indicate the presence of an interferer, techniques already incorporated into existing AGC and site selection strategies. Presetting the optimum step attenuator level prior to acquisition simultaneously achieves faster access and more accurate site selection metric by minimizing retries and desense effects that could "false" signal integrity estimates.

With regard to the selection of a new cellular site, as is well known in the art, a mobile radio controller (MRC) maintains a list of adjacent channels for roaming operations. The MRC periodically samples adjacent channels to obtain signal quality and ranks them based on measured signal quality. Multiple samples ($N_{adj}$) may be taken for each adjacent channel and filtered to ride over fast fades. The filtered signal quality is used to rank the adjacent channels. Adjacent channels are sampled on a broadcast channel (BCCH) slot to minimize loss of data on serving slot. Thus, the rate of sampling may be varied according to the serving channel quality. The sampling rate may be inversely proportional to serving channel signal quality (higher the serving channel quality, lower the sampling rate) by changing number of samples taken per frame (frame periodicity). The higher the number of samples per frame, the higher the sampling rate. Multiple samples are taken per channel in an interleaved manner and filtered to rank the channels. The serving channel can be sampled continuously in every slot and filtered signal quality can be obtained after a fixed number of $N_{home}$ slots. After each sampling cycle, serving channel is compared against highest ranked adjacent channel and roaming decision is made based on selection threshold.

As noted herein, current day handoff techniques utilize a centralized base station to manage system parameters without consideration of and unrelated to AGC and associated IM enhancements. The site selection method of the present invention emphasizes handset control of site selection using integrated AGC techniques to maximize IM performance and blocking performance a priori to handoff. The method in accordance with the present invention can be applied in slotted protocols for cell site selection including, but not limited to, wideband and narrowband linear modulation implementations such as Terrestrial Trunked Radio (TETRA). The AGC portion of the invention is applicable to any digital signal processing (DSP) based radio including frequency modulation (FM) and Association of Public-Safety Communications Officials Project 25 (APCO 25).

To summarize, the interference mitigation methods of the present invention provide several advantages over the prior art that include: 1) Faster system access since enhanced AGC management reduces "retries" by eliminating the need for proper demodulation and sync on input signal before making decision; 2) Improved system coverage since transceiver performance (IM and blocking) expand effective RF coverage in spectrally congested environments, and 3) Increased system capacity due to the elimination of redundant channel assignments to a single band in view of peak interference that generates site change requests and subsequently subsides, allowing continued usage of previous channel. As is well known in the art, the site channel change will presuppose AGC reconfiguration for new assignment forcing the drop of original channel.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for maximizing intermodulation interference protection comprising the steps of:
   during a mobile assisted handoff between radio channels within a cell site within a communication system;
   scanning a plurality of radio channels within the site;
   measuring signal power for each of the scanned radio channels;
   determining an attenuation level engaged by a continuous automatic gain control (AGC) for each of the scanned radio channels;
   selecting a radio channel to receive based on the measured signal power and the determined attenuation level;
   detecting on-channel intermodulation (IM) interference on the received radio channel;
   selecting a new radio channel to receive from the plurality of scanned radio channels based on the measured signal power and the determined attenuation level;
   detecting intermodulation (IM) interference on the selected radio channel;
   pre-setting receiver attenuators for the selected radio channel based on the detection of intermodulation (IM) interference and AGC attenuation level; and
   changing to the selected channel.

2. A method for maximizing intermodulation interference protection as in claim 1, further including the step of:
   varying the rate of scan of the plurality of radio channels based on number of preset attenuators presently engaged for reducing the necessity to switch to another radio channel; and
   varying an attenuation threshold of the continuous AGC based on the degree of intermodulation interference.

3. A method for maximizing intermodulation interference protection as in claim 1, wherein the step of measuring signal power includes the step of:
   establishing an on-channel and adjacent channel signal quality metric determined based on synchronization and pilot symbols embedded in time division multiplexed (TDM) time slots.

4. A method for mitigating intermodulation interference comprising the steps of:
   using channel power estimation and attenuation in a two-way radio communications system by performing the steps of:
   receiving communications data during a mobile assisted handoff from at least one of a plurality of communications cell sites within the two-way radio communications system; measuring channel signal power from both an on-channel and adjacent communication cell site sources;
   measuring attenuation level engaged by continuous automatic gain control (AGO) attenuation from both the on-channel and adjacent sources;
   creating an on-channel quality metric and adjacent sources quality metrics based on the IM interference;
   comparing the quality metrics for the on-channel and adjacent sources;
   selecting an adjacent cell site from the plurality of communications cell sites having an adjacent source quality metric greater than the on-channel quality metric;
   pre-setting receiver attenuators for the selected adjacent cell site based on the detection of intermodulation (IM) interference and AGC attenuation level; and
   changing to the selected adjacent cell site.

5. A method for mitigating intermodulation interference as in claim 4, wherein the step of receiving further includes the step of:
   scanning the plurality of communications cell sites.

6. A method for mitigating intermodulation interference as in claim 5, further including the step of:
   varying the rate of scan of based on number of attenuators presently engaged.

7. A method for mitigating intermodulation interference as in claim 4, wherein the on-channel metric and adjacent sources quality metrics, are determined based on synchronization and pilot symbols embedded in time division multiplexed (TDM) time slots.

* * * * *